(12) United States Patent
Kitamura et al.

(10) Patent No.: US 7,303,712 B2
(45) Date of Patent: Dec. 4, 2007

(54) METHOD OF INJECTION MOLDING AND COMPRESSIVE DECORATION MOLDING A MOLDED PRODUCT

(75) Inventors: Akihiro Kitamura, Osaka (JP); Nobuo Iijima, Osaka (JP); Yoshihiko Saitou, Osaka (JP); Haruo Okada, Nagano-ken (JP); Toru Ikeda, Nagano-ken (JP)

(73) Assignees: Nippon Bee Chemical Co., Ltd., Osaka (JP); Nissei Plastic Industrial Co., Ltd., Nagano-ken (JP)

( * ) Notice: Subject to any disclaimer, the term of this patent is extended or adjusted under 35 U.S.C. 154(b) by 125 days.

(21) Appl. No.: 10/423,844

(22) Filed: Apr. 25, 2003

(65) Prior Publication Data
US 2003/0227109 A1 Dec. 11, 2003

(30) Foreign Application Priority Data
Apr. 26, 2002 (JP) ............................. 2002-126499

(51) Int. Cl.
*B29C 45/16* (2006.01)
(52) U.S. Cl. ...................... 264/255; 264/308; 264/319; 264/328.1
(58) Field of Classification Search ............. 264/328.8, 264/328.1, 294, 250, 319, 255
See application file for complete search history.

(56) References Cited

U.S. PATENT DOCUMENTS

| | | | | |
|---|---|---|---|---|
| 4,849,145 A | * | 7/1989 | Hirsch ........................ | 264/46.4 |
| 5,053,179 A | * | 10/1991 | Masui et al. ................. | 264/257 |
| 5,154,872 A | * | 10/1992 | Masui et al. ................. | 264/266 |
| 5,183,615 A | * | 2/1993 | Zushi .......................... | 264/219 |
| 5,356,576 A | * | 10/1994 | Fischbach .................... | 264/40.4 |
| 5,401,580 A | * | 3/1995 | Meguriya et al. ............. | 428/451 |
| 5,811,039 A | * | 9/1998 | Addeo et al. ................ | 264/46.4 |
| 5,851,558 A | * | 12/1998 | Atake .......................... | 425/111 |
| 5,853,510 A | * | 12/1998 | Lawson ........................ | 156/64 |
| 6,019,923 A | * | 2/2000 | Pelzer .......................... | 264/132 |
| 6,132,662 A | * | 10/2000 | Preisler et al. .............. | 264/241 |

(Continued)

FOREIGN PATENT DOCUMENTS

JP 2001-38783 2/2001

*Primary Examiner*—Monica A Huson
(74) *Attorney, Agent, or Firm*—Weingarten, Schurgin, Gagnebin & Lebovici LLP

(57) ABSTRACT

Injection molding of a product and compressive decoration molding of a surface of the molded product are performed using individual cavity molds. A decorative film can be molded efficiently with a thermosetting coating material under suitable temperature control regardless of the shape of the molded product. An injection cavity mold and a decoration cavity mold are employed. The injection cavity mold is set at a hardening temperature of a thermoplastic resin. The decoration cavity mold is set at a thermosetting temperature of a coating material. A molded product is injection-molded in the cavity mold for injection molding and released from the mold. A decorative coating material composed of a liquid thermosetting composition is mounted at least on a part of the top of the injection-molded product. The molded product is located within the cavity mold for decoration molding. A thin decorative film is decoration-molded over the surface of the injection molded product by compression spreading the coating material within the cavity mold for decoration molding over the whole surface to be decorated. The coating material is composed of a liquid thermosetting composition that substantially contains no volatile component having a boiling point below the thermosetting temperature set on the cavity mold for decoration molding.

4 Claims, 5 Drawing Sheets

U.S. PATENT DOCUMENTS

| | | | |
|---|---|---|---|
| 6,132,669 A * | 10/2000 | Valyi et al. | 264/510 |
| 6,203,744 B1 * | 3/2001 | Hara et al. | 264/266 |
| 6,251,323 B1 * | 6/2001 | Hoedl et al. | 264/254 |
| 6,395,219 B1 * | 5/2002 | Preisler et al. | 264/513 |
| 6,508,967 B2 * | 1/2003 | Visconti et al. | 264/138 |
| 6,656,406 B2 * | 12/2003 | Parrinello | 264/268 |
| 6,716,519 B2 * | 4/2004 | Ueno et al. | 428/308.4 |
| 6,838,027 B2 * | 1/2005 | Brodi et al. | 264/138 |
| 6,872,349 B2 * | 3/2005 | Hier et al. | 264/328.7 |
| 7,060,217 B2 * | 6/2006 | Dunton et al. | 264/299 |

* cited by examiner

METHOD OF INJECTION MOLDING AND COMPRESSIVE DECORATION MOLDING A MOLDED PRODUCT

BACKGROUND OF THE INVENTION

1. Field of the Invention

The present invention relates to a molding method, which comprises steps of an injection molding of a molded product using a synthetic resin and successive compression spread molding of a decorative film over a surface of the molded product using a coating material.

2. Description of the Related Art

In a method so-called In-Mold Coat Molding, a decorative film of a coating material is molded over a surface of a molded product of a synthetic resin. In this method, a cavity mold for the injection molding is also used as that for the decoration molding.

For example, JP 2001-38783A discloses a conventional molding method, which comprises providing an injection cavity mold and a core to form a cavity for a molded product; injecting a melted resin fully into the cavity to form the molded product; moving the core slightly backward to form a desired space between the surface of the molded product and the surface of the cavity; and injecting a decorative coating material into the space to form a decorative film.

In such the conventional molding method that employs the injection cavity mold commonly in two types of molding for the molded product and the decorative film, the cavity mold and the core are set at a hardening temperature of a thermoplastic resin for injection molding of the product. Therefore, if the coating material is composed of a thermoplastic resin composition, there is no difficulty in temperature control of the cavity mold. To the contrary, if the coating material is composed of a thermosetting composition, it is required to elevate the temperature in the cavity mold up to a thermosetting temperature of the coating material in a short time after the injection molding.

The hardening temperature of the thermoplastic resin set on the cavity mold and the core has a difference from the thermosetting temperature of the coating material. This temperature difference varies depending on the material resin of the molded product and the substrate of the coating material though it has a value of at least 30° C. or more. It is considered technically difficult to elevation control such the temperature difference in a limited molding time. Therefore, the conventional molding method that employs the injection cavity mold commonly for the two types of molding has a problem because it is hardly utilized in decoration molding using a thermosetting coating material.

The space for molding the decorative film is formed in retreating operation of a movable table that carries the core attached thereon or a moving device located inside the table. Therefore, the formation of the space requires a sophisticated positioning control and a means for retaining the space. In addition, the formation of the space by the retreat of the core is limited in between opposing surfaces: a front surface of the molded product and a surface of the cavity. In this case, vertical sides of the product are in parallel with the moving direction of the core and keep in contact with the cavity surface without forming any space therebetween. Therefore, it is impossible to mold a decorative film over vertical sides of a box-like molded product, resulting in a problem because the decoration molding is restricted in products molded in limited shapes.

The problem associated with the common use of the mold can be solved by the use of individual molds for injection molding of the product and molding of the decorative film. In the molding of the decorative film by injecting a coating material, the coating material may contain fine flat shiny materials such as aluminum pigment to exhibit a metallic painting color. In this case, when the coating material is injected into the cavity, the aluminum pigment vigorously collide with each other at a welded portion, varying the orientation and distribution of aluminum pigment easily, and causing lines and variations of aluminum pigment distribution disadvantageously.

The decoration cavity mold is set at a temperature as high as 80° C. or more to thermoset the coating material. It is required to thermally insulate the supply gate and passage for the coating material connected to the cavity so as not to precure the coating material by the heat from the cavity mold. As a result, the decoration cavity mold has a complicated structure and is hardly controlled.

The present invention has an object to provide a new method of injection molding and compressive decoration molding a molded product. This method employs individual cavity molds for injection molding a molded product and for decoration molding a surface of the molded product by compression spreading successively in order to solve the problems associated with the conventional common use of the mold and with the injection to the common mold. It is capable of efficiently molding a decorative film with a thermosetting coating material under suitable temperature control regardless of the shapes of injection molded products.

SUMMARY OF THE INVENTION

In accordance with the above object, the present invention is directed to a method of injection molding a molded product and successive decoration molding of a decoration film over a surface of a molded product, which comprises providing a cavity mold for injection molding and a cavity mold for decoration molding; setting the cavity mold for injection molding at a hardening temperature of a thermoplastic resin and the cavity mold for decoration molding at a thermosetting temperature of a coating material; injection molding a molded product in the cavity mold for injection molding and releasing the molded product from the mold; mounting a decorative coating material composed of a liquid thermosetting composition at least on a part of the top of the injection molded product; locating the molded product within the cavity mold for decoration molding; and decoration molding a thin decorative film over the surface of the injection molded product by compression spreading the coating material within the cavity mold for decoration molding over the whole surface to be decorated.

In the above method, the phrase "substantially containing no volatile component" means that, even if a volatile component is contained in the liquid thermosetting composition, the volatile component is allowed to have a content within a range that causes no problem in the step of molding the decorative film. For example, the volatile component may be contained if the content is below 5% by weight, preferably below 3% by weight, because such the content can not break the purpose of the present invention.

It is preferable for the compression spreading to gradually pressurize the coating material at a rate within a range of 1-10 mm/sec by mold clamping. Preferably, the temperature in the decoration cavity mold is set in consideration of the reactivity of the coating material so as not to thermally harden the coating material until the compression spreading is completed. Even if the coating material contains aluminum pigment as the shiny material, a decorative film can be formed over the surface of the molded product by compression spreading at a rate within the above range without disturbing the orientation of aluminum pigment.

In the present invention, the thermosetting temperature set on the cavity mold for decoration molding is contained within a range of from 80° C. to 140° C., preferably from 110° C. to 140° C. In this case, the coating material has a viscosity of 3,000-100,000 mPa·s, preferably 10,000-50,000 mPa·s. The viscosity is measured by brook-field viscosity meter in conformity with JIS K5600-2-3 (1999) under condition at 25 degree C., 6 rpm.

In the present invention, the method may further comprise providing a core shared by the cavity mold for injection molding and the cavity mold for decoration molding; and moving the two cavity molds relative to the core or moving the core relative to the two cavity molds after the injection molding and prior to the decoration molding.

In the above method, the injection molding of the molded product and the compression-spread molding of the decorative film can be performed in individual cavity molds and temperatures suitable for their molding. Therefore, it is possible to perform both moldings under proper temperature control to mold the decorative film of the thermosetting coating material over the surface of the molded product to be decorated. A supply gate for the coating material can be provided as a nozzle, spaced from the cavity mold for decoration molding, to mount the coating material at least on a part of the top of the molded product without suffering any heats from the cavity mold for decoration molding. Therefore, it is easily possible to keep the coating material always at a temperature of 40° C. or below where it is hard to thermoset said coating material. Accordingly, the mold can be simplified without special devises such as installation of the heat insulator in the case of supply of coating material.

When the cavity mold for decoration molding is clamped with the core that holds the molded product, the cavity for decoration is formed on the surface of the molded product to be decorated. Therefore, the cavity is not limited on the top of the molded product but can be formed easily on the sides that are in parallel with the direction of mold clamping and continued from the top. The compression spreading of the coating material forms the decorative film. Therefore, without the need for a sophisticated positioning control of the movable table, a decorative film with a desired thickness as determined can be formed not only on the top but also on vertical sides of the molded product in the form of a box, for example.

Temperatures on both cavity molds can be set individually for injection molding of a thermoplastic resin material to form a molded product and decoration molding of a thermosetting resin coating material to form a decorative film. In addition, the temperature control of the cavity mold for decoration molding can be divided into plural systems to even the thermosetting of the coating material. Therefore, it is possible to mold a product having a high gloss surface and excellent in decorated conditions such as adhesion, weather resistance and mar resistance independent of a thickness of the decorative film, coupled with the compression spreading of the coating material.

BRIEF DESCRIPTION OF THE DRAWINGS

The present invention will be more fully understood from the following detailed description with reference to the accompanying drawings, in which.

DETAILED DESCRIPTION OF THE PREFERRED EMBODIMENTS

Figure 5:
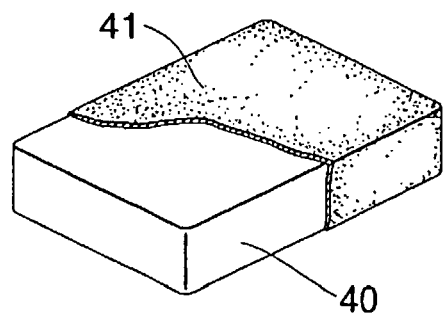
FIG. 5 is a perspective view of a product according to the present invention, from which the decorative film is partly cut off.

FIGS. 1-4 show an embodiment to slide an injection cavity mold 1 and a decoration cavity mold 2 relative to a core mold 3, for injection molding of a product 40 using a synthetic thermoplastic resin, and for decoration molding of a decorative film 41 over a surface of the molded product as shown in FIG. 5, using a vertical molding machine.

Figure 6:
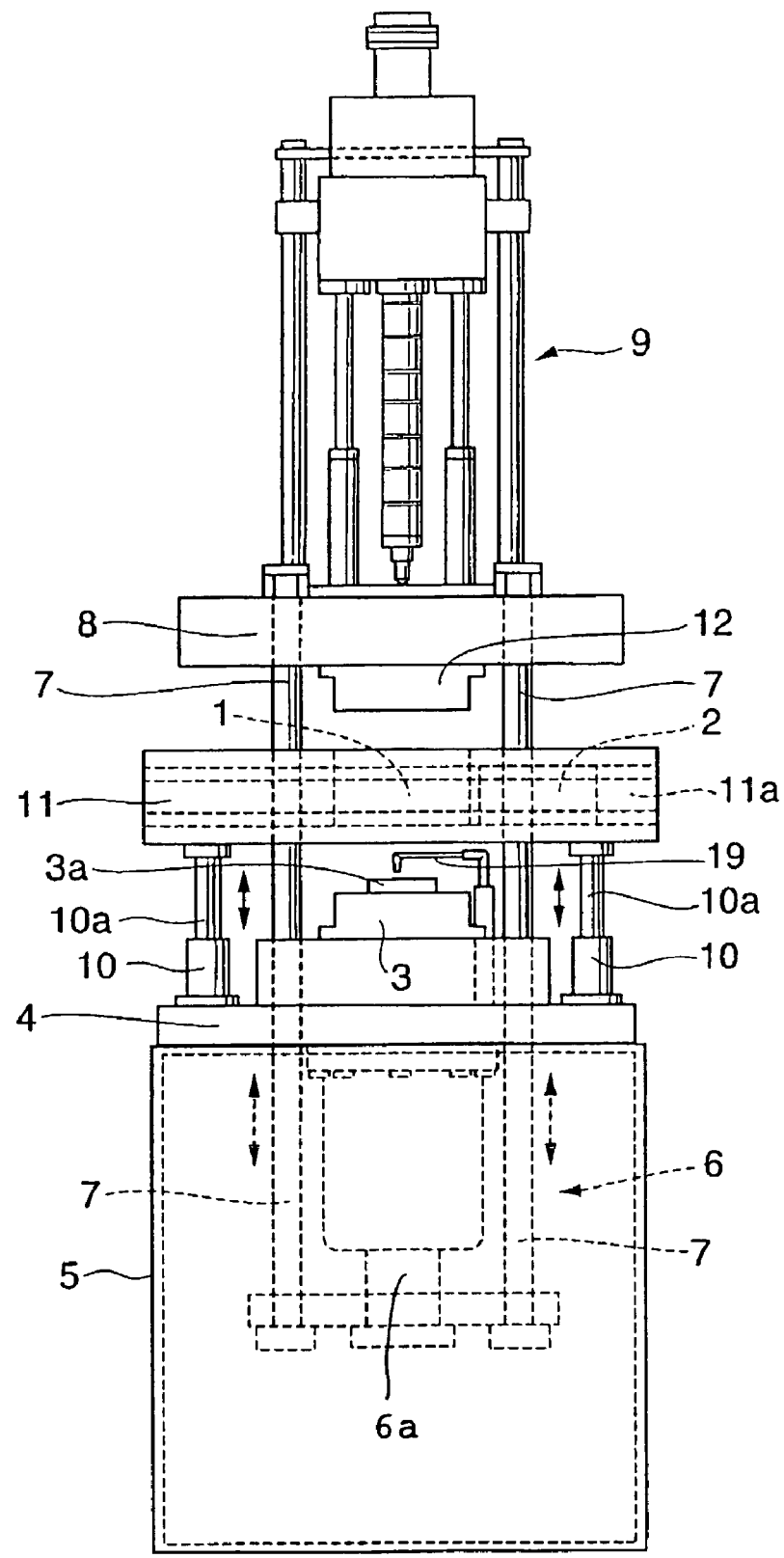
FIG. 6 is a front view showing an embodiment of a vertical injection molding machine for use in the present invention.

In the vertical molding machine shown in FIG. 6, a mold mount table 4 is located on the upper surface of a machine base 5, which includes a hydraulic mold clamping unit 6. A pair of mold clamping rods 7 are linked to the mold clamping unit 6 and arranged to pass through the base 5. A movable table 8 is linked to the upper ends of the mold clamping rods 7 and located on the mold mount table 4. An injection unit 9 is provided standing on the movable table 8. A laterally elongated sliding base 11 is coupled to rods 10a of elevation cylinders 10 standing on both sides of the mold mount table 4 and held slidably up/down between the mold mount table 4 and the movable table 8.

In FIGS. 1-4, the injection cavity mold 1 and the decoration cavity mold 2 can be replaced alternatively with each other between the core mold 3 secured on the mold mount table 4 and a runner mold 12 secured on the lower surface of the movable table 8. For this purpose, the molds 1 and 2 are arranged in parallel on the sliding base 11 and attached to a guide member 11a and a moving device, not shown.

The injection cavity mold 1 has a recess 14 in its parting face facing the core mold 3. The recess 14 and a core 3a at the center of the core mold form a cavity 13 for the molded product 40 consisting of a top plate and four vertical side plates. A side gate 15 is formed in between a parting face outside the recess 14 and a parting face of the core mold 3. In a parting face of the mold 1 that faces the runner mold 12, a runner 18 is formed for connecting a sprue 16, which is bored at the center of the runner mold 12, to a distribution hole 17, which is bored in the injection cavity mold 1 and connected to the side gate 15. The reference numeral 19 denotes a supply nozzle for injecting the coating material, which includes a turning device, not shown, for reciprocally moving over the core mold on opening mold (see FIG. 4).

The decoration cavity mold 2 includes a mold member 22 that has a recess 21 in a parting face to form a cavity 20 for decoration when it receives the molded product 40 together with the core 3a; a mold body 23 that houses the mold member 22 fitted in a parting face facing the core mold 3; and a heat insulator 24 interposed between the mold body 23 and the mold member 22.

Figure 3:
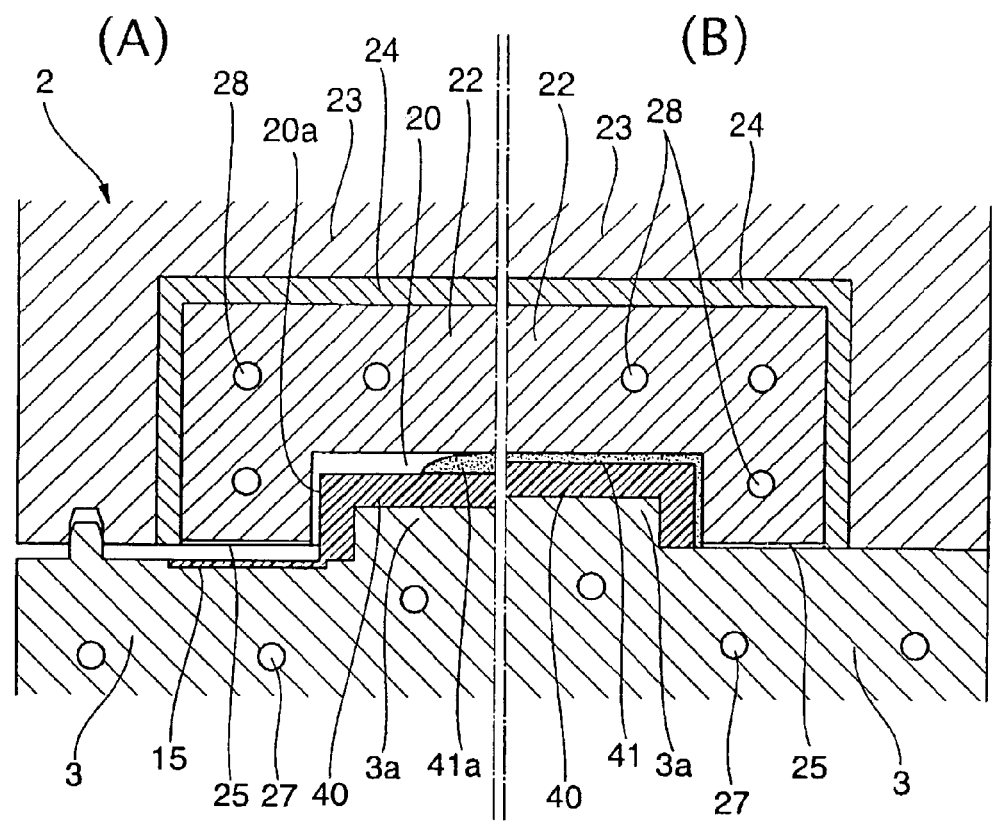
FIG. 3 is a vertical cross-sectional front view showing (A) a state of a coating material before compression and (B) a state of a decorative film during compression in the decoration cavity mold.
Figure 4:
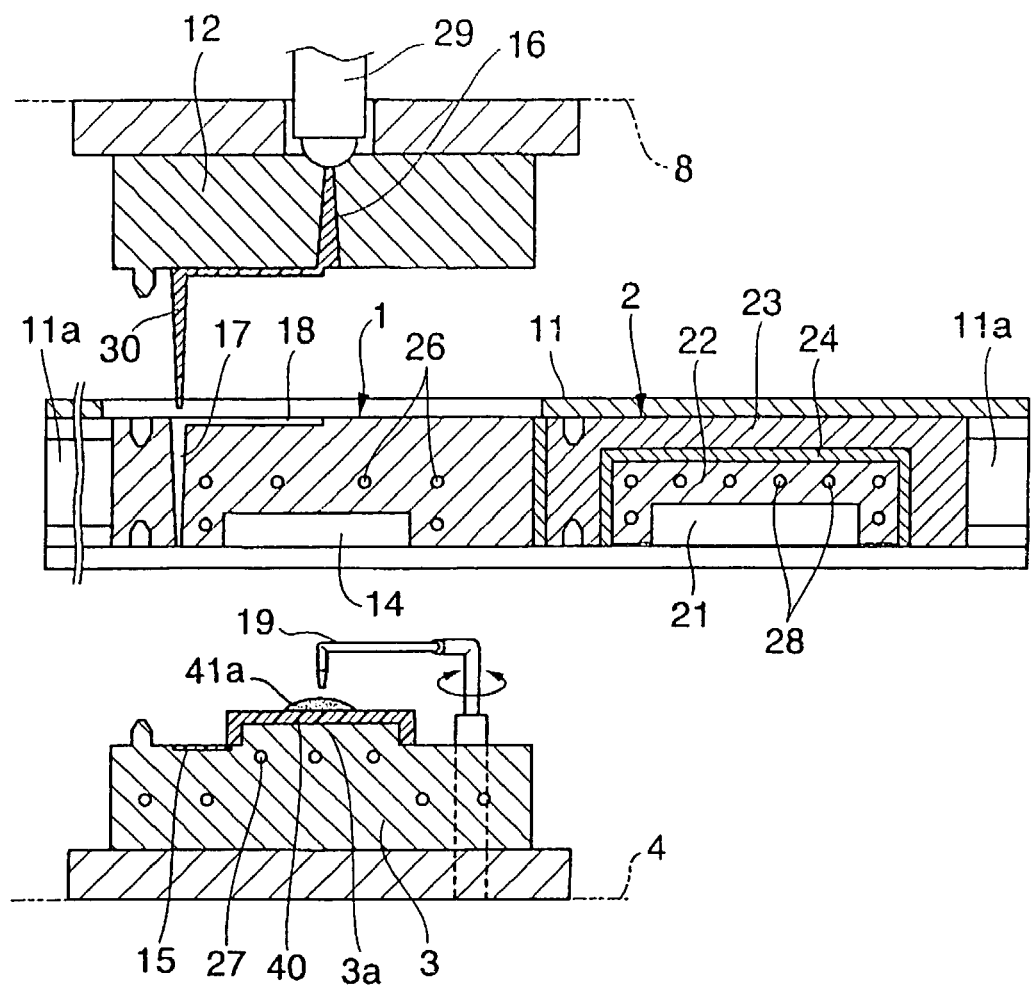
FIG. 4 is a vertical cross-sectional front view showing a state of opening mold.

A gas vent 25 is formed at a parting surface of the mold member 22 as shown in FIG. 3.

Temperature control paths 26, 27 and 28 are formed inside the injection cavity mold 1, the core mold 3 and the mold member 22, respectively. By means of temperature control media supplied into these temperature control paths, the injection cavity mold 1 and the core mold 3 are kept at a hardening temperature of the resin (40° C. to 80° C.). The mold member 22 of the decoration cavity mold 2 is kept at a thermosetting temperature of the coating material 41a (80° C. to 140° C.).

Heating by a cartridge heater is applicable to the temperature control for the mold member 22 of the decoration cavity mold 2. The temperature control can be performed in two systems divided into the top and the side to adjust variations in temperature.

Figure 1:
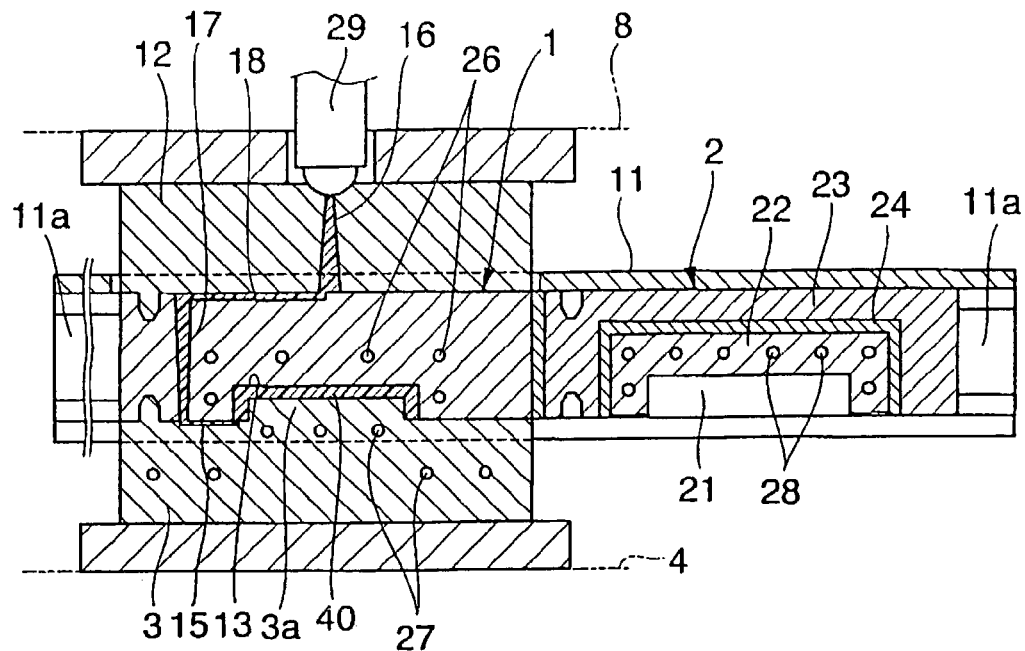
FIG. 1 is a vertical cross-sectional front view showing molds for injection molding and decoration molding to form a molded product according to the present invention, which shows the injection molded product.
Figure 2:
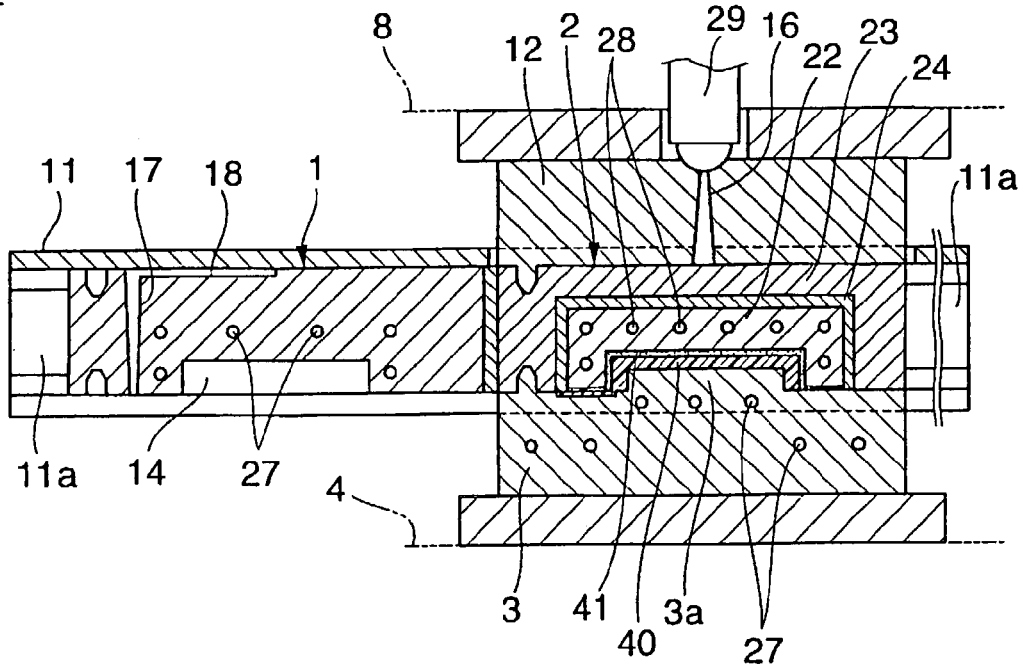
FIG. 2 is a vertical cross-sectional front view showing the molded product replaced into a decoration cavity mold.

Of the injection molding and the decoration molding by the mold device, the injection molding of the molded product 40 should be performed first. In a state of opening mold, the nozzle 19 is on standby outside the mold as shown in FIG. 6. In this state, the sliding base 11 is supported at a position of opening mold by the rods 10a of the elevation cylinders 10. The injection cavity mold 1 contained in the sliding base 11 is located in between the runner mold 12 and the core mold 3 by means of a moving device, not shown. A piston 6a in the mold clamping unit 6 is elongated downward to move the movable table 8 together with the runner mold 12 downward along the clamping rods 7 to clamp the injection cavity mold 1 with the runner mold 12. The rod 10a of the elevation cylinder 10 is then shortened downward to move the sliding base 11 together with the movable table 8 downward so as to clamp the injection cavity mold 1 with the core mold 3 stepwise to clamp three molds as shown in FIG. 1. Alternatively, the mold clamping unit 6 and the elevation cylinder 10 are actuated successively in parallel. After the mold clamping, a melted resin is injected through the injection nozzle 29 into the runner mold 12 and injected fully into the cavity 13 from the side gate 15 through the runner 18 and the passage 17.

Available resins as the material of the molded product 40 include polyolefine, polycarbonate, polyurethane, polyester, polyamide, ABS, and vinyl chloride.

When the resin injected into the cavity 13 is hardened through cooling under constant pressure, the product 40 is molded in the form of a box. Thereafter, the mold clamping unit 6 and the elevation cylinder 10 are elongated simultaneously or stepwise to elevate the movable table 8 and the sliding base 11 up to the state of opening mold in FIG. 6. According to the opening mold, the injection molded product 40, fitted around the core 31a by contraction during hardening, can be released from the injection cavity mold 1 and residually held on the core mold 3. A runner 30 is also drawn out in between the injection cavity mold 1 and the runner mold 12.

A robot, not shown, is employed to remove the runner 30. Then, both cavity molds on the sliding base 1 are shifted from the state of FIG. 4 to the left side to replace the decoration cavity mold 2 from the right side to a location between the core mold 3 and the runner mold 12, which are now opened. Before or after the replacement, the supply nozzle 19 is rotationally moved to above the core mold. Then, the decorative coating material 41a is supplied out of the supply nozzle 19 and mounted on the top center of the molded product 40. The supply amount is determined based on an area of the surface of the molded product 40 to be decorated and a thickness of the decorative film 41. The injection is not limited in a single location but may be applied to plural locations.

After completion of the replacement of the decoration cavity mold 2 and the mounting of the coating material 41a, the piston 6a of the mold clamping unit 6 is elongated downward first to clamp the decoration cavity mold 2 with the runner mold 12. Subsequently, the rod 10a of the elevation cylinder 10 is shortened to clamp the decoration cavity mold 2 with the core mold 3. According to the mold clamping, the molded product 40 with the coating material 41a mounted on the top thereof can enter the recess 21 in the decoration cavity mold 2, together with the core 3a. As a result, a cavity 20 with a space as shown in FIG. 3A is primarily formed between the molded product 40 and the cavity surfaces facing the top and sides of the molded product 40.

The space of the cavity 20 at the top of the product is reduced as the mold clamping advances, and consequently the cavity surface compresses the coating material 41a on the top. As a result, the decorative film 41 with a designed thickness is molded as shown in FIG. 3B. Spaces at sides of the molded product 40 are in parallel with the direction of mold clamping and can not be reduced by mold clamping. Therefore, the cavity 20a at the side is previously determined to have a space equal to the thickness of the decorative film 41 in order to mold the decorative film 41 with the same thickness from the top to the side.

The thickness of the decorative film 41, which covers the surface of the molded product 40 to be decorated, can be determined within a range of 50-200 µm. The molded product 40 tends to reduce the thickness on cooling during molding. The thicker the molded product, the more the thickness reduces extremely. Therefore, in the thicker molded product, the space is determined expecting its variation. In contrast, the thinner the molded product, the smaller the variation in the thickness. Therefore, preferably the space is determined without expectation.

The coating material 41a may be composed of a liquid thermosetting composition. The coating material 41a suffers heating in the cavity. If it has a composition that contains a volatile component with a boiling point below the thermosetting temperature, a problem is easily caused when the volatile component vaporizes. To avoid this problem, the coating material 41a is preferably composed of a liquid thermosetting composition that substantially contains no volatile component with a boiling point below the thermosetting temperature set on the decoration cavity mold. A preferable composition may be mixed at least with agents excellent in properties of adhesion with the material, durability, viscosity adjustment, crosslinking initiation, decoration, and anti foaming. For example, when a polypropylene resin is employed as the material of the molded product 40, a composition suitable for the coating material 41a may be mixed with acrylic modified polyolefine, reactive oligomer, reactive diluent, radical polymerization initiator, decorative materials such as fine flat bright materials of aluminum pigment, and additives.

Preferably, the coating material 41a has a viscosity of 3,000-100,000 mPa·s, more preferably 10,000-50,000 mPa·s. The viscosity is appropriately selected based on the space size and flow length in the cavity 20 and the cavity temperature.

The coating material 41a on the top of the molded product is gradually compressed between the cavity surface and the molded product 40 when the space reduces as the mold clamping advances. Thus, it flows over the surface to be decorated and spreads from the center of the top to four sides. The coating material 41a is thermosetted while it flows inside the heated cavity, beginning from the cavity-surface side. The flow speed is proportional to the compression rate. Accordingly, if the compression rate is lower, the thermosetting of the coating material advances at the cavity-surface side more than at the surface to be decorated, forming weld and causing mottle due to variations in shiny materials such as aluminum pigment.

To the contrary, if the compression rate is higher, the flow resistance intensively acts. As a result, a uniform compression flow can not be achieved and an uneven thickness distribution occurs easily in the decorative film 41 due to spread variations. Therefore, the compression rate should be determined in consideration of the viscosity of the applied coating material 41a, the thickness of the decorative film 41 to be molded, and the thermosetting temperature. If the coating material 41a requires a speed, it is preferable to determine the thermosetting temperature low to suppress the thermosetting at the cavity-surface side and reduce thermosetting time differences in the direction of the film thickness.

Preferably, the coating material is gradually pressurized at a rate within a range of 1-10 mm/sec by mold clamping. In addition, the temperature in the decoration cavity mold is set in consideration of the reactivity of the coating material 41a so as not to thermosetting the coating material 41a until the compression spreading is completed. Even if the coating material 41a contains aluminum pigment, a decorative film 41 can be formed at a rate within the above range without disturbing the orientation of aluminum pigment, preventing appearance defects such as weld lines and aluminum pigment mottle in the metallic coating.

After the thermosetting time for the decorative film 41 is elapsed, the decoration cavity mold 2 and the core mold 3 are opened like in the case of the injection cavity mold 1. Then, the completed product having the decorative film 41 formed on the surface of the molded product 40 is released from the mold. After the mold releasing, the decoration cavity mold 2 is slid together with the injection cavity mold 1 to the right side for replacement with the injection cavity mold 1, now pushed out to the left side, for clamping mold again as shown in FIG. 1. Then the step is shifted to the next injection molding of a new molded product.

As described above, to injection mold the product and to compression mold the decorative film over the surface of the molded product, this method employs two cavity molds: the injection cavity mold and the decoration cavity mold. This method differs from the case in which a single cavity mold is employed commonly for injection molding of the product and molding of a decorative film. Suffering no limitations within the scope of variation in injection-moldable shapes of molded products to be subjected to molding of decoration films, this method can mold the decorative film uniformly over the vertical sides of the molded product in addition to the top thereof.

The temperatures on both cavity molds can be set individually. Therefore, under suitable temperature control, it is always capable of injection molding a thermoplastic resin to form a molded product and decoration molding a thermosetting coating material to form a decorative film. In addition, the temperature control of the decoration cavity mold can be divided into plural systems to even the thermosetting of the coating material. Therefore, it is also possible to easily mold a metallic product with no appearance defect and excellent in molding accuracy and decoration without being affected by the thickness of the decorative film.

In the molding of the decorative film by clamping mold, the coating material mounted on the top of the injection molded product is compressed within the decoration cavity mold and thinly spread over the whole surface to be decorated. Therefore, there is no complication in the process steps. In addition, when the coating material is supplied from above the top, it is not influenced from heat in the decoration cavity mold. Therefore, the temperature of the coating material is always kept below the thermosetting temperature so as to prevent the coating material from gelling (hardening) when it is supplied. Thus, the decoration cavity mold has a simplified structure and can be controlled easily because it requires no installation of any injection path and heat insulator.

Figure 7:
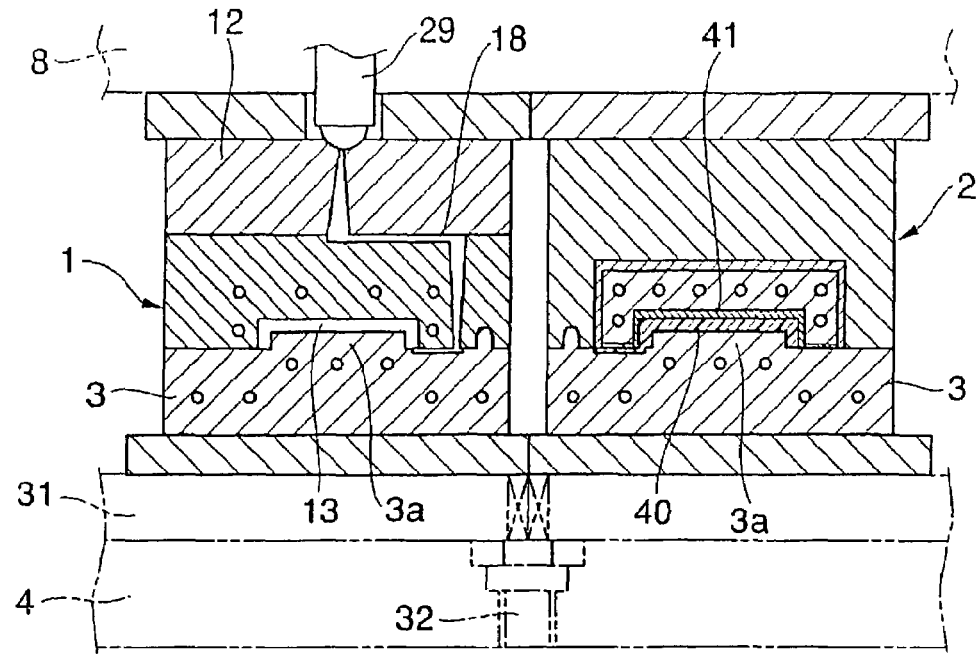
FIG. 7 is a vertical cross-sectional front view showing a mold device in another embodiment that rotates a pair of core molds to replace one with another.
Figure 8:
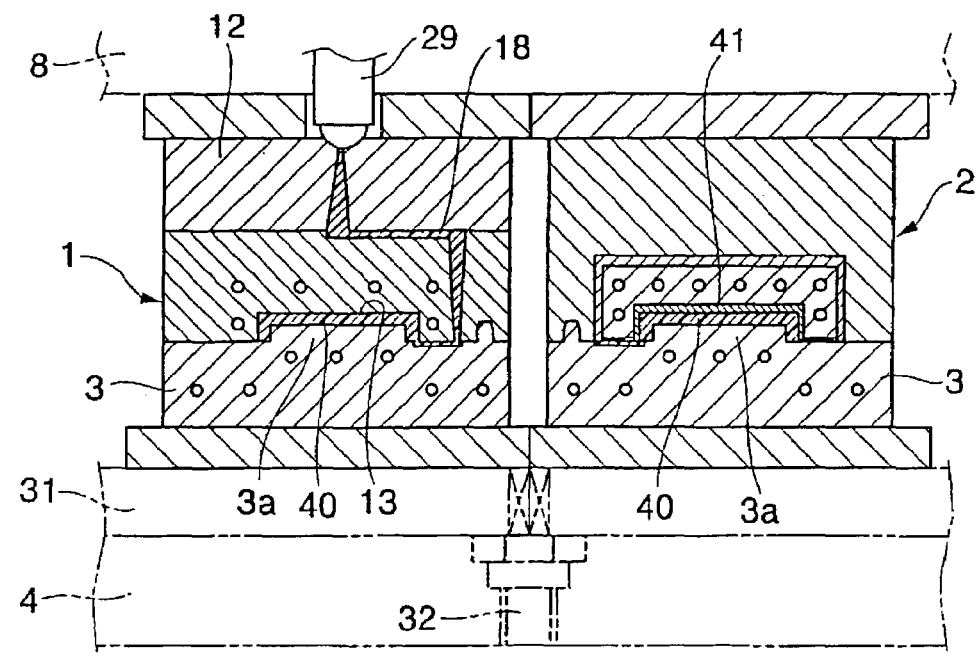
FIG. 8 is a vertical cross-sectional front view showing an injection molded product and a compression spread decorative film.

FIGS. 7 and 8 show another embodiment to rotate core molds 3 relative to an injection cavity mold 1 and a decoration cavity mold 2 for injection molding a product 40 and decoration molding a decorative film 41 using a two-color molding machine. The molding machine includes the same means for clamping mold and injecting as those in the vertical molding machine shown in FIG. 6. The same parts as those in the previous embodiment are omitted for explanation, and the major parts are explained with the reference numerals attached thereto.

The molding machine includes a rotary plate 31, which can rotate 180° about a rotary shaft 32 located at the center on the upper surface of the machine base 5. A pair of left and right core molds 3, 3 are attached on the rotary plate 31. The injection cavity mold 1 and the decoration cavity mold 2 opposing to the core molds 3, 3 are fixedly secured on the lower surface of the movable table 8 located on the upper ends of the mold clamping rods 7. The rotary plate 31 is employed to switch the core molds 3, 3 alternately relative to the injection cavity mold 1 and the decoration cavity mold 2. In this structure, if the runner 18 is a hot runner, the mold releasing of the runner after opening mold can be omitted.

Replacement of the core molds 3, 3, though it is not shown in the figure, can be performed by: injection molding of the product 40 and decoration molding of the decorative film 41; after completion of both, elevating the movable table 8 to open the injection cavity mold 1 and the decoration cavity mold 2 from the core molds 3, 3; and then rotating the rotary plate 31 by 180° to switch the positions of the core molds 3, 3.

At the opening mold, the product covered with the compression-spread decorative film 41 is released from the mold, and the coating material is injected onto the center of the top of the molded product 40, followed by replacing the core molds 3, 3 with each other. The movable table 8 is lowered for clamping mold after the replacement. Thus, a cavity 13 for the molded product 40 is formed at the injection cavity mold 1. At the decoration cavity mold 2, the product 40 previously injection molded enters a recess in the decoration cavity mold 2 together with the core 3a like in the previous embodiment. The coating material injected onto the center of the top is compressed until completion of clamping mold. As a result, a thin decorative film 41 is molded over the whole surface of the molded product 40 to be decorated.

After the mold clamping, injection molding is performed in the injection cavity mold 1 to mold the product 40 and the decorative film 41 is thermosetted in the decoration cavity mold 2 during the same period. After completion of cooling to harden the molded product 40 and the thermosetting of the decorative film 41, the molds are opened. After the product is released from the mold and the coating material is injected onto the center of the top of the molded product 40, the core molds 3, 3 are replaced again with each other, shifting the step to the next molding.

Thus, the pair of core molds 3, 3 are rotated and alternately switched to the injection cavity mold 1 and the decoration cavity mold 2 that are arrayed in parallel. This method is capable of injection molding the product 40 and compression-spread molding the decorative film 41 at the same time. Therefore, it has a higher molding efficiency suitable for mass production compared to the above-described method in which the injection cavity mold 1 and the decoration cavity mold 2 are slid and switched alternately to the core mold 3.

EXAMPLE

| | |
|---|---|
| Material of Molded product: | Polypropylene |
| Shape of Molded product: | Box type, 150 wide × 210 deep × 20 mm high |
| Thickness of Molded product: | 2.5 mm |
| Thickness of Decorative film: | 100 μm |
| Coating material: | KX-1031 (A), Silver metallic, Trade name of Nippon Bee Chemical, Co., Ltd., Japan |
| Viscosity: | 20,000 mPa · s/ (25° C., 6 rpm) Measured by B-type viscometer made by TOKIMEC INC., Japan |
| Amount of Supply: | 6.9 cm$^3$ |
| Thermosetting Time: | 60 sec |
| Molding machine used: | TH150-18VSE, Mold slide replacement |
| Temperature in Injection cavity mold: | 80° C. |
| Temperature in Core mold: | 80° C. |
| Mold clamping force (Injection molding): | 126 tonf |
| Molding time: | 60 sec |
| Space set in Decoration cavity mold: | 100 μm |
| Temperature in Decoration cavity: | 120° C. |
| Compression force: | 20 tonf |
| PERFORMANCE RESULTED IN PRODUCT | |
| Gloss (Reflectivity at 60 degrees): | 91 |
| FF value (Flip-Flop): | 1.5 |
| Initial adhesion (2 mm cross-cut): | 100/100 |
| Secondary adhesion after water resistance test: | 100/100 |
| Weather resistance (SWOM 1000 H) GR: | 91 |
| ΔE: | 2.0 |
| Mar resistance: | Passed |

(Mar resistance test: 8 sheets of gauze are put on a test piece, and a weight of 500 g is put on the gauze in an rubbing tester, which reciprocates it 100 times and determines that the test piece is passed if it is not damaged on its appearance)

Having described the embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A method of injection molding and decoration molding a molded product, comprising:

providing a cavity mold for injection molding, a cavity mold for decoration molding, and a core mold;

setting said cavity mold for injection molding and said core mold at a hardening temperature of a thermoplastic resin and setting said cavity mold for decoration molding at a thermosetting temperature of a decorative coating material within a range of from 80° C. to 140° C.;

injection molding the thermoplastic resin to form a molded product between said cavity mold for injection molding and said core mold;

releasing said cavity mold from said injection molded product held on said core mold;

mounting the decorative coating material composed of a liquid thermosetting composition at least on a part of the top of said injection molded product prior to clamping said product within said cavity mold for decoration molding, said decorative coating material having a viscosity of 3000-100,000 mPa·s (25° C.);

locating said injection molded product held on said core mold within said cavity mold for decoration molding; and decoration molding a thin decorative film having a thickness of within a range of 50 to 200 μm over the surface of said injection molded product by compression spreading said decorative coating material within said cavity mold for decoration molding over the whole surface to be decorated by clamping said cavity mold for decoration molding with said core mold, wherein a space is primarily formed between the injection molded product and a cavity surface of said cavity mold for decoration molding facing the top and sides of said injection molded product, the space at the top of the injection molded product is reduced as the mold clamping advances and said decorative coating material on the top of said injection molded product is compressed between the surface of said cavity mold for decoration molding and said injection molded product at a rate within a range of 1-10 mm/sec by the mold clamping.

2. The method of claim 1, wherein said coating material is composed of a liquid thermosetting composition substantially containing no volatile component having a boiling point below said thermosetting temperature set on said cavity mold for decoration molding.

3. The method of claim 1,
wherein said core mold is shared by said cavity mold for injection molding and said cavity mold for decoration molding; and
further comprising the step of moving said two cavity molds relative to said core mold or moving said core mold relative to said two cavity molds after said injection molding and prior to said decoration molding.

4. The method of claim 2,
wherein said core mold is shared by said cavity mold for injection molding and said cavity mold for decoration molding; and
further comprising the step of moving said two cavity molds relative to said core mold or moving said core mold relative to said two cavity molds after said injection molding and prior to said decoration molding.

* * * * *